(12) United States Patent
Prokopow

(10) Patent No.: US 8,156,861 B1
(45) Date of Patent: Apr. 17, 2012

(54) COLLAPSIBLE FOOD HOLDING SYSTEM

(76) Inventor: Ian Ashe Prokopow, Calgary (CA)

( * ) Notice: Subject to any disclaimer, the term of this patent is extended or adjusted under 35 U.S.C. 154(b) by 602 days.

(21) Appl. No.: 12/340,317

(22) Filed: Dec. 19, 2008

(51) Int. Cl.
*A47J 37/07* (2006.01)
*A47J 43/18* (2006.01)

(52) U.S. Cl. ...... 99/419; 99/421 R; 99/421 A; 99/421 V; 99/449; 211/85.4; 211/200; 269/54.5; 294/61

(58) Field of Classification Search ............ 99/419, 99/421 R, 421 A, 421 HV, 421 V, 426, 427, 99/449; 211/85.4, 171, 200; 248/165, 166, 248/171, 440.1; 269/54.4, 54.5; 294/61; 452/194, 196
See application file for complete search history.

(56) References Cited

U.S. PATENT DOCUMENTS

| 63,383 | A | * | 4/1867 | Hanks | 248/166 |
|---|---|---|---|---|---|
| 255,215 | A | * | 3/1882 | Tuttle | 248/166 |
| 256,811 | A | * | 4/1882 | Smith | 248/166 |
| 311,662 | A | * | 2/1885 | Knight | 99/449 |
| 333,777 | A | * | 1/1886 | Palmer | 269/54.5 |
| 488,485 | A | * | 12/1892 | Smith | 248/166 |
| 849,290 | A | | 4/1907 | Vanderbilt | |
| 1,677,880 | A | * | 7/1928 | Averill | 99/427 |
| 1,683,675 | A | * | 9/1928 | Howe | 248/166 |
| 2,090,793 | A | * | 8/1937 | Hallum | 99/421 A |
| 2,608,928 | A | * | 9/1952 | McDonnell | 99/421 A |
| 2,846,942 | A | | 8/1958 | Bowman | |
| 3,665,843 | A | * | 5/1972 | Moore | 99/419 |
| 4,676,466 | A | * | 6/1987 | Nakao et al. | 248/166 |
| 4,779,308 | A | | 10/1988 | van de Nieuwelaar et al. | |
| 5,569,071 | A | | 10/1996 | Metier et al. | |
| 5,569,072 | A | | 10/1996 | Tieleman et al. | |
| 5,676,594 | A | | 10/1997 | Joosten | |
| 5,833,178 | A | * | 11/1998 | Plasse et al. | 248/27.8 |
| 6,877,706 | B2 | * | 4/2005 | Harrison | 248/165 |
| 2005/0247655 | A1 | * | 11/2005 | Larimer et al. | 211/200 |
| 2008/0296447 | A1 | * | 12/2008 | Peterson | 248/171 |

* cited by examiner

*Primary Examiner* — Stephen F Gerrity
(74) *Attorney, Agent, or Firm* — David A. Guerra

(57) ABSTRACT

A collapsible food holding system for holding and supporting food during preparation, cleaning or cooking. The collapsible food holding system has an inner frame assembly, and an outer frame assembly pivotably connected to the inner frame assembly via a hinge. The inner frame assembly has an enclosed configuration, and the outer frame assembly has a substantially U-shaped configuration with a tool end located at each free end thereof. The inner and outer frame assemblies each have a hinge pivotably engagable with each other. The tool ends are adapted to retain a food item on the outer frame assembly or between the inner and outer frame assemblies. The outer frame assembly is sized to receive the inner frame assembly in its interior when the inner frame assembly is pivoted about the hinge.

20 Claims, 5 Drawing Sheets

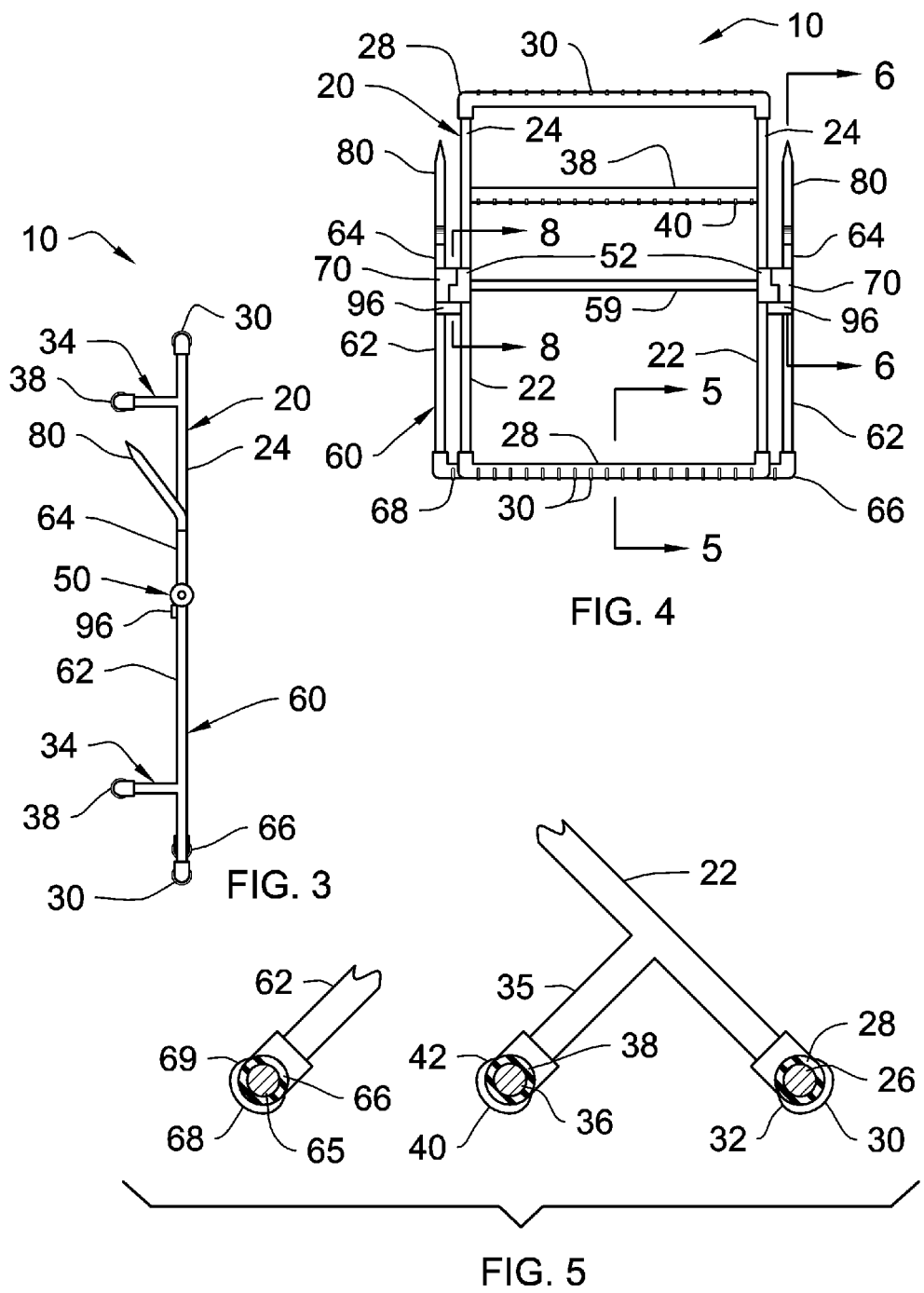

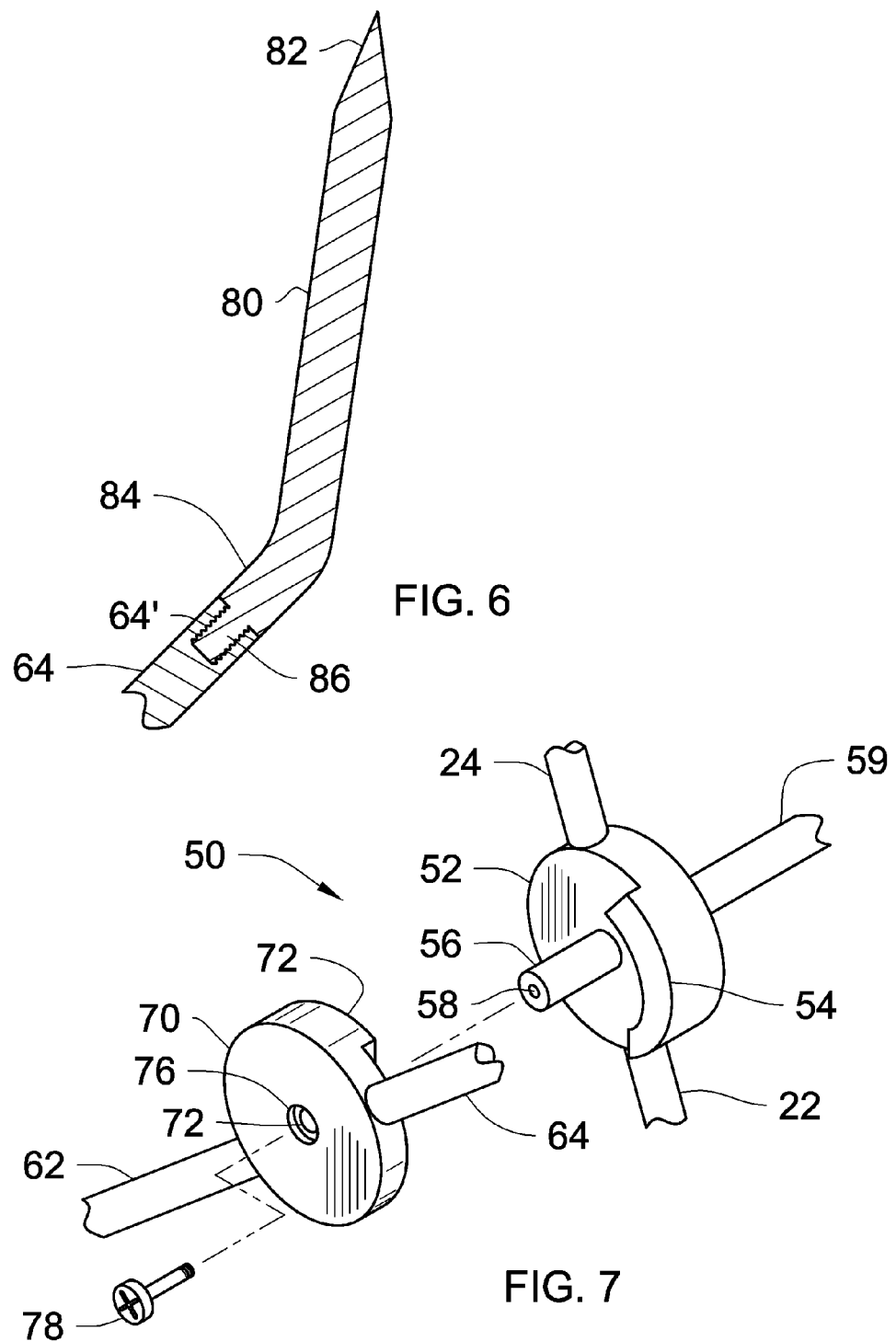

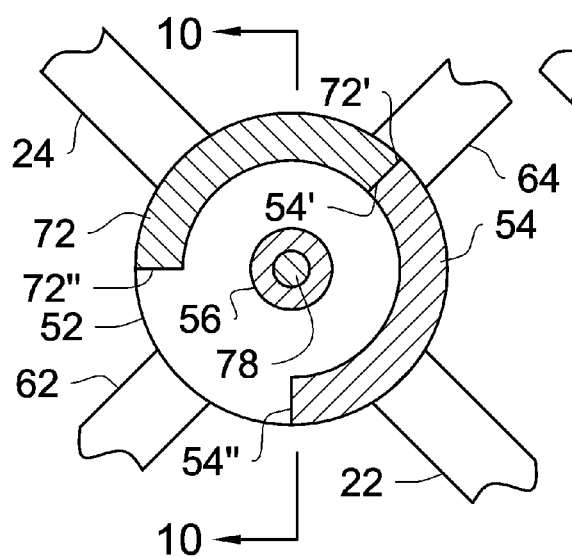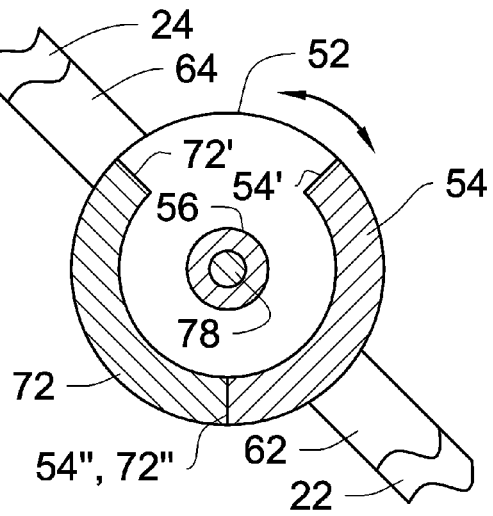
FIG. 8  FIG. 9
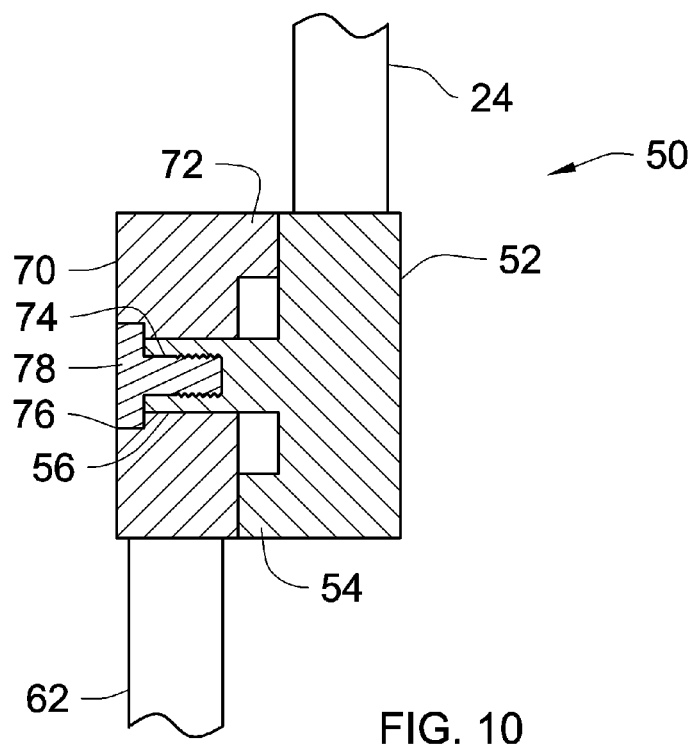
FIG. 10

COLLAPSIBLE FOOD HOLDING SYSTEM

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of the Invention

The present invention relates to a collapsible food holding system and has particular utility in connection with holding and supporting food during preparation, cleaning or cooking.

2. Description of the Prior Art

Collapsible food holding systems are desirable for aiding in the preparing and cleaning of large, heavy or awkwardly shaped foods. Many people have dropped foods onto the ground, such as chickens, turkeys, hams, and the like while preparing them or cleaning them. This task can be very difficult for older, weaker or physically challenged people. The collapsible food holding system is a simple collapsible tool that would make these tasks easier for people.

While the known food holding devices fulfill their respective, particular objectives and requirements, the aforementioned patents do not describe a collapsible food holding system that allows holding and supporting food during preparation, cleaning or cooking.

Therefore, a need exists for a new and improved collapsible food holding system that can be used for holding and supporting food during preparation, cleaning or cooking. In this regard, the present invention substantially fulfills this need. In this respect, the collapsible food holding system according to the present invention substantially departs from the conventional concepts and designs of the prior art, and in doing so provides an apparatus primarily developed for the purpose of holding and supporting food during preparation, cleaning or cooking.

SUMMARY OF THE INVENTION

In view of the foregoing disadvantages inherent in the known types of food holders and stands now present in the prior art, the present invention provides an improved collapsible food holding system, and overcomes the above-mentioned disadvantages and drawbacks of the prior art. As such, the general purpose of the present invention, which will be described subsequently in greater detail, is to provide a new and improved collapsible food holding system and method which has all the advantages of the prior art mentioned heretofore and many novel features that result in a collapsible food holding system which is not anticipated, rendered obvious, suggested, or even implied by the prior art, either alone or in any combination thereof.

To attain this, the present invention essentially comprises an inner frame assembly, and an outer frame assembly pivotably connected to the inner frame assembly via a hinge. The inner frame assembly has an enclosed configuration, and the outer frame assembly has a substantially U-shaped configuration with a tool end located at each free end thereof. The inner and outer frame assemblies each have a hinge pivotably engagable with each other. The tool ends are adapted to retain a food item on the outer frame assembly or between the inner and outer frame assemblies. The outer frame assembly is sized to receive the inner frame assembly in its interior when the inner frame assembly is pivoted about the hinge.

The inner frame assembly can further comprise a pair of handles located at opposite ends and perpendicular with the inner frame assembly.

There has thus been outlined, rather broadly, the more important features of the invention in order that the detailed description thereof that follows may be better understood and in order that the present contribution to the art may be better appreciated.

The invention may also include grips enclosing each end and handles of the inner frame assembly, and an end of the outer frame assembly. The grips can also include ribs extending thereout. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible food holding system that has all of the advantages of the prior art food holders and stands and none of the disadvantages.

It is another object of the present invention to provide a new and improved collapsible food holding system that may be easily and efficiently manufactured and marketed.

An even further object of the present invention is to provide a new and improved collapsible food holding system that has a low cost of manufacture with regard to both materials and labor, and which accordingly is then susceptible of low prices of sale to the consuming public, thereby making such collapsible food holding system economically available to the buying public.

Still another object of the present invention is to provide a new collapsible food holding system that provides in the apparatuses and methods of the prior art some of the advantages thereof, while simultaneously overcoming some of the disadvantages normally associated therewith.

Even still another object of the present invention is to provide a collapsible food holding system for holding and supporting food during preparation, cleaning or cooking. This allows for a user to easily and comfortably carry or prepare the food item.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side plane view of the collapsible food holding system of the present invention in a collapsed or folded configuration.

FIG. 4 is a front plane view of the collapsible food holding system of the present invention.

FIG. 5 is a cross-sectional view of the collapsible food holding system of the present invention taken along line 5-5 in FIG. 4.

FIG. 6 is a cross-section view of the tool end connection of the collapsible food holding system of the present invention taken along line 6-6 in FIG. 4.

FIG. 7 is an exploded perspective view of the hinge of the collapsible food holding system of the present invention.

FIG. 8 is a cross-section view of the hinge of the collapsible food holding system of the present invention taken along line 8-8 in FIG. 4.

FIG. 9 is a cross-section view of the hinge in FIG. 8 in a second position of the collapsible food holding system of the present invention.

FIG. 10 is a cross-section view of the hinge of the collapsible food holding system of the present invention taken along line 10-10 in FIG. 8.

The same reference numerals refer to the same parts throughout the various figures.

DESCRIPTION OF THE PREFERRED EMBODIMENT

Figure 1:
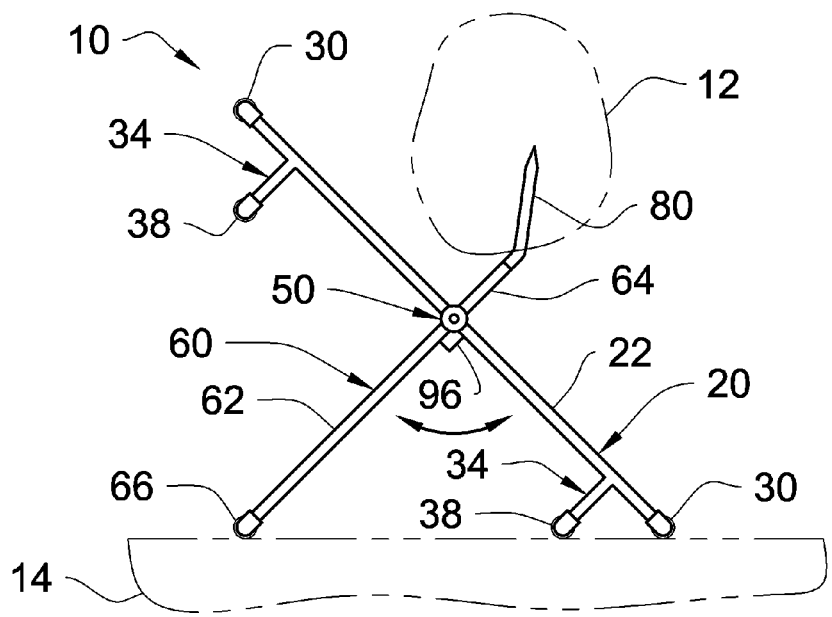
FIG. 1 is a side plane view of the preferred embodiment of the collapsible food holding system constructed in accordance with the principles of the present invention, with the phantom lines depicting environmental structure and forming no part of the claimed invention.

Referring now to the drawings and particularly to FIGS. 1-12, a preferred embodiment of the collapsible food holding system of the present invention is shown and generally designated by the reference numeral 10.

Figure 2:
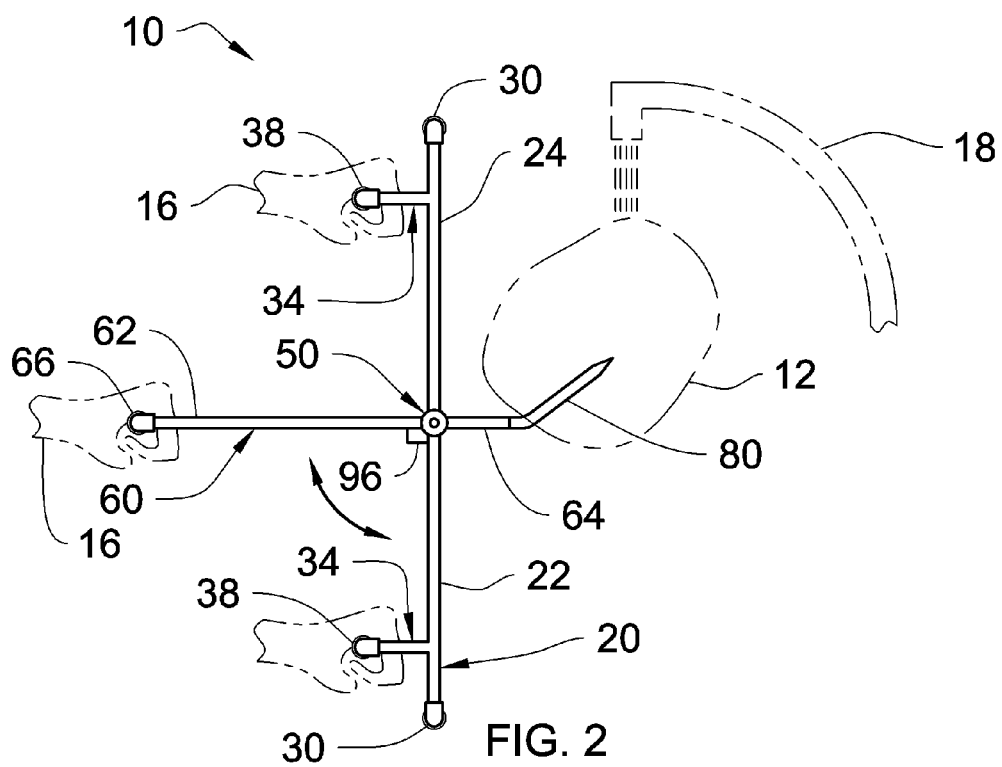
FIG. 2 is a side plane view of the collapsible food holding system of the present invention.

A new and improved collapsible food holding system 10 of the present invention for holding and supporting food 12 during preparation, cleaning or cooking is illustrated in FIG. 1. The collapsible food holding system 10 in this configuration is used to support the food 12 in a fixed position on a surface 14, such as but not limited to a counter, table, stove, oven rack, grille, or any substantially horizontal surface. In this configuration and a use, a user can easily and efficiently prepare or clean the food 12, without directly holding, contacting or supporting the food. The collapsible food holding system 10 can also be placed directing in the oven or heat source for supporting the food 12 during cooking. The collapsible food holding system 10 can also be grasped by the user's hands 16 for carrying the food 12 or for positioning the food under a faucet or water source 18 for cleaning or rinsing the food 12, as best illustrated in FIG. 2.

More particularly, the collapsible food holding system 10 has an inner frame assembly 20 and an outer frame assembly 60 pivotally connected to the inner frame assembly via a hinge 50. The food 12 is retained and secured in position by tool ends 80. The hinge 50 allows the inner frame assembly 20 to be pivoting into the outer frame assembly 60, as best illustrated in FIG. 3. The outer frame assembly 60 has a greater width than the inner frame assembly 20 thereby providing an interior area adapted to receive the inner frame assembly when pivoted in its closed or folded configuration. In the closed or folded configuration, the collapsible food holding system 10 can be easily storied in a drawer or on a shelf, and can be easily transported or carried.

As best illustrated in FIG. 4, the inner frame assembly 20 has a pair of first side members 22, a pair of second side members 24, a pair of handles 34, a pair of hinges 52, and a cross member 59. Each first side member 22 is connected to a corresponding hinge 52, and each second side member 24 connected to the hinge 52 opposite the first side member 22. A pair of end members 26 is used to connect the pair of first and second side members 22, 24 respectively. One end member 26 is connected to the free ends of the first side member 22, and the other end member 26 is connected to the free ends of the second side member 24, thereby orientating the first and second side members in a substantially parallel configuration with the hinges 52 centrally located. The cross member 59 is connected to the hinges 52 and is substantially parallel with the end members 26. The first side members 22, second side members 24, end members 26, handle side members 35, handle members 36, and cross member 59 are all substantially elongated rigid members, such as but not limited to rods, bars, struts, and the like. The first and second side members 22, 24 are substantially equal in length.

Each end member 26 is enclosed, covered or coated with a grip 28 featuring ribs 30 spaced thereon, as best illustrated in FIG. 5. The ribs 30 prevent lateral movement of the end members 26 when in contact with the surface 14. Each rib 30 extends out from the grip 26 in a direction inline with their respective first and second side members 22, 24, and features arcuate ends 32 that transition each rib 30 flush with the grip 28 opposite the rib 30. The arcuate ends 32 allows for a comfortable grip by the user's hands 16, in that the ribs 30 do not extend into the interior of their respective end members 26 and thereby come in contact with the user's fingers. Each grip 28 can extend past each end member 26 and along a portion of each first and second side members 22, 24. The grips 28 are made from a cushioning material, such as but not limited to rubber, foam, plastic, sponge, and the like.

The handles 34 each has a pair of handle side members 35, and a handle member 36. One handle 34 is positioned in the generally vicinity of one end member 26 and extending from the first side member 22, and the other handle 34 is positioned in the generally vicinity of the other end member 26 and extending from the second side member 24, thereby positioning the handles 34 adjacent each end of the inner frame assembly 20. Each handle side member 35 is connected to their respective first and second side member 22, 24 at a substantially 90 degree angle and are parallel with each other. The length of each handle side member 35 is equal to the distance from its connection point to their respective first and second side member 22, 24 to end members 26 connected thereto. One handle member 36 is connected to the free ends of the handle side members 35 connected to the first side members 22, and the other handle member 36 is connected to the free ends of the handle side members 35 connected to the second side members 24.

Each handle member 36 is enclosed, covered or coated with a grip 38 featuring ribs 40 spaced thereon, as best illustrated in FIG. 5. The ribs 40 prevent lateral movement of the handle 34 when in contact with the surface 14. Each rib 40 extends out from the grip 38 in a direction inline with their respective handle side members 35, and features arcuate ends 42 that transition each rib 40 end flush with the grip 38 opposite the rib 40. The arcuate ends 42 allows for a comfortable grip by the user's hands 16, in that the ribs 40 do not extend into the interior of the handles 34 and thereby come in contact with the user's fingers. Each grip 38 can extend past each handle member 36 and along a portion of each handle side member 35. The grips 38 are made from a cushioning material, such as but not limited to rubber, foam, plastic, sponge, and the like.

The outer frame assembly 60 has a pair of first side members 62, a pair of second side members 64, a pair of tool ends 80, and a pair of hinges 70. Each first side member 62 is connected to a corresponding hinge 70, and each second side member 64 connected to the hinge 70 opposite the first side member 62. An end member 65 is used to connect the pair of first side members 62. The end member 65 is connected to the free ends of the first side member 62 opposite the hinge 70, thereby orientating the first side members 62 in a substantially parallel configuration. The first side members 62, second side members 64, and end member 65 are all substantially elongated rigid members, such as but not limited to rods, bars, struts, and the like. The second side members 64 have a length less than the first side members 62, and the first side members 62 have a length greater than the first side members 22 of the inner frame assembly 20 from the end member 26 to the inner frame hinge 52.

As best illustrated in FIG. 5, the end member 65 is enclosed, covered or coated with a grip 66 featuring ribs 68 spaced thereon. The ribs 68 prevent lateral movement of the end member 65 when in contact with the surface 14. Each rib 68 extends out from the grip 66 in a direction inline with the first side members 62 of the outer frame assembly 60, and features arcuate ends 69 that transition each rib 68 end flush with the grip 66 opposite the rib 68. The arcuate ends 69 allows for a comfortable grip by the user's hands 16, in that the ribs 68 do not extend into the interior of the outer frame assembly 60 and thereby come in contact with the user's fingers. Each grip 66 can extend past each end member 65 and along a portion of each first side member 62. The grips 66 are made from a cushioning material, such as but not limited to rubber, foam, plastic, sponge, and the like.

The tool end 80 is removably attached to the free end of the second side member 64, as best illustrated in FIG. 6. The tool end 80 has a tapered member 82, an attachment member 84, and threaded end 86 extending out from a free end of the attachment section 84. The threaded end 86 is adapted to engage with and be received in a defined threaded bore 64' in the free end of each of the second side members 64 of the outer frame assembly 60. The tapered member 82 can be angularly displaced from the attachment member 86, and is adapted to retain the food 12 between the tool end 80 and the first or second members 22, 24 of the inner frame assembly 20, or the food 12 can be impaled by the tapered member 82.

Each hinge 50 is composed of the inner frame assembly hinge (inner frame hinge) 52 engagable with the outer frame assembly hinge (outer frame hinge) 70, as best illustrated in FIG. 7. Each of the inner frame hinges 52 has a stop 54, a post 56, and a threaded bore 58 defined in the post 56. Each of the inner frame hinges 52 has a substantially circular configuration, with the stop 54 extending out from the outer edge or circumference of the inner frame hinge 52 away from the inner frame assembly 20. Each stop 54 has a first stop edge 54' and second stop edge 54" thereby forming the stop 54 into a protrusion. Each first stop edge 54' is positioned at a substantially 90 degree angle from the first side member 22 of the inner frame assembly 20, and each second stop edge 54" is positioned at a substantially 45 degree angle from the first side member 22 opposite the first stop edge 54', as best illustrated in FIG. 8. The post 56 extends out from the center of the inner frame hinge 52 away from the inner frame assembly 20.

Each of the outer frame hinges 70 has a stop 72, a first defined bore 74 therethrough, and a second defined bore 76 in communication with the first bore 74. Each of the outer frame hinges 70 has a substantially circular configuration, with the stop 72 extending out from the outer edge or circumference of the outer frame hinge 70 toward the inner frame hinge 52. Each stop 72 has a first stop edge 72' and second stop edge 72" thereby forming the stop 72 into a protrusion. Each first stop edge 72' is positioned at a substantially inline with the first and second side members 62, 64 of the outer frame assembly 60, and each second stop edge 72" is positioned at a substantially 45 degree angle from the first side member 62, as best illustrated in FIG. 8. The post 56 of the inner frame hinge 52 is received in the first bore 74 of the outer frame hinge 70 until the outer frame hinge stop 72 comes in contact with the inner frame hinge 52 or the inner frame hinge stop 54 comes in contact with the outer frame hinge 70.

In an open position of the collapsible food holding system 10, as best illustrated in FIG. 8, the first stop edge 72' of outer frame hinge 70 is in contact with the first stop edge 54' of the inner frame hinge 52. The first stop edges 54', 72' prevent the collapsible food holding system 10 opening past a certain angular position determined by the angular position of the each of the first stop edges 54', 72', and they carry the weight of the food 12 placed on the tool end 80. The first stop edges 54', 72' bears all rotational moment or force produced by the weight of the food 12 which is displaced a distance from the pivot axis of the hinge 50. In a closed or folded configuration of the collapsible food holding system 10, as best illustrated in FIG. 9, the second stop edge 74" of the outer frame hinge 70 is in contact with the second stop edge 54" of the inner frame hinge 52 when the inner frame assembly 20 or the outer frame assembly 60 or folded about the pivot axis of the hinge 50. The second stop edges 54", 72" prevent the collapsible food holding system 10 from being folded past a certain angular position determined by the angular position of the each of the second stop edges 54", 72". The angular position of the second stop edges 54", 72" allow the inner and outer frame assemblies 20, 60 to be folding into a compact configuration with the inner and outer frame assemblies 20, 60 aligned with or parallel with each other, and with the inner frame assembly 20 received in the interior of the outer frame assembly 60. It can be appreciated that the stops 54, 72 can be positioned and oriented in different angle or positions to provide a variable of opened and closed positions of the inner and outer frames 20, 60.

A fastener 78 featuring a head with a larger diameter than the fastener is used to rotatably retain the outer frame hinge 70 to the inner frame hinge 52. The head of the fastener 78 is received in the second bore 76 of the outer frame hinge 70 and a threaded end of the fastener 78 is engagable with the threaded bore 58 of post 56 of the inner frame hinge 52, as best illustrated in FIG. 10. The resistance force of the hinge 50 can be controlled by tightening or loosening the fastener 78, which clamps the outer frame hinge 70 to the inner frame hinge 52. With the outer frame hinge 70 positioned against the inner frame hinge 52, the post 56 of the inner frame hinge 52 acts as the pivoting axis of the hinge 50.

The first stop edges 54', 72' orient the collapsible food holding system 10 so that the one of the end member grips 28 and its corresponding handle grip 38 of the inner frame assembly 20 and the end member grip 66 of the inner frame assembly 60 are all in contact with the surface 14. This produces an extremely stable stand 10 for supporting food 12, while prevent any movement along the surface 14.

Figure 11:
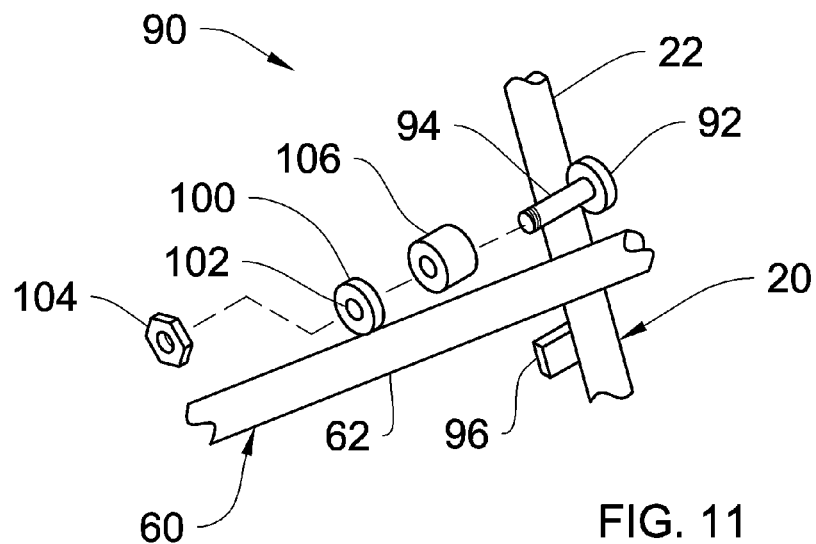
FIG. 11 is an exploded perspective view of an alternate embodiment hinge of the collapsible food holding system of the present invention.

An alternate embodiment hinge 90 is best illustrated in FIG. 11. The first and second side members of the inner frame assembly 20 are formed as one single side member 22 thereby producing a pair of side members 22. An inner frame hinge 92 is centrally connected to each side member 22. Each inner frame hinge 92 has a post 94 extending away from each inner frame hinge 92 and the inner frame assembly 20, and a stop 96 extending out from the side member 22 in the direction of the post 94. The post 94 has a threaded end adapted to be received by and engage with a nut 104. The first and second side members of the outer frame assembly 60 are formed as one single side member 62 thereby producing a pair of side members 62. The outer frame assembly 60 has an inner frame hinge 100 located in the vicinity of the tool end, but positioned so that the length the of the portion of the outer side member 62 opposite the tool end is greater in length than the side member 22 of the inner frame assembly 20 from the end member to the inner frame hinge 92. The inner frame hinge 100 has a bore 102 defined therethrough sized to receive the post 94 of the inner frame hinge 92. The nut 104 is threadably engaged with the threaded end of the post 94 thereby securing the inner and outer frame hinges 92, 100 together with the post 94 acting as the pivot axis for the hinge 90. A spacer 106 can be used between the inner frame hinge 92 and the outer frame hinge 100 to provide some separation between the inner and outer frame assemblies 20, 60. The stop 96 has a length equal enough to extend out past the side member 62 of the outer frame assembly 60 when the inner and outer frame hinges 92, 100 are assembled. The stop 96 is positioned along the side member 22 to prevent the collapsible food holding system 10 from opening past a predetermined angled, since the stop 96 will come in contact with the side member 62 of the outer frame assembly 60.

Figure 12:
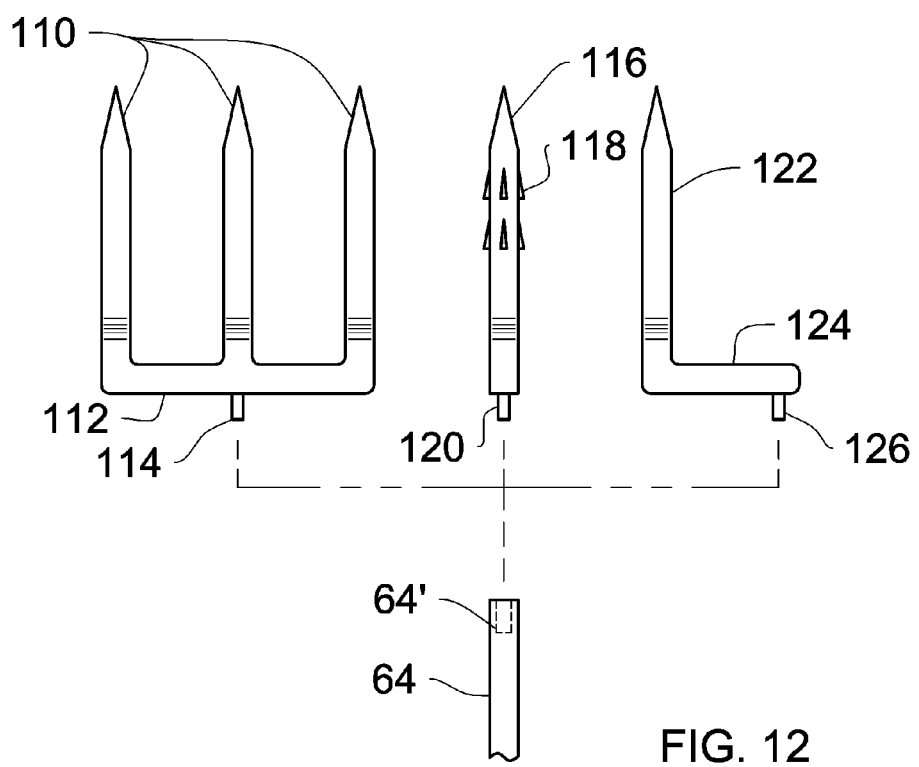
FIG. 12 is an exploded front plane view of alternate embodiment the tool ends of the collapsible food holding system of the present invention.

Alternate embodiment tool ends are best illustrated in FIG. 12. A first alternate embodiment tool end 110 has a plurality of tapered members connected to a central tapered member via connection members 112. A threaded end 114 is attached to either the central tapered member or to a coupling section of the connection members 112. The threaded end 114 is received by and engagable with the threaded bore 65 of the second side member 64 of the outer frame assembly. The tapered member can be angularly displaced from their respective connection members 112 and is adapted to retain the food 12 between the tool end 110 and the first or second members of the inner frame assembly, or the food 12 can be impaled by the tapered member. A second alternate embodiment tool end 116 has a tapered member, a plurality of barbs 118 extending out from the tapered member, and a threaded end 120 opposite the tapered end. The threaded end 120 is received by and engagable with the threaded bore 65 of the second side member 64 of the outer frame assembly. The tapered member can be angularly displaced from the threaded end 120 and is adapted to retain the food 12 between the tool end 116 and the first or second members of the inner frame assembly, or the food 12 can be impaled by the tapered member. A third alternate embodiment tool end 122 has a tapered member, connection member 124, and a threaded end 126. The tapered member is attached to one end of the connection member 124 and the threaded end 126 is attached to and extending away from the other end of the connection member 124. The threaded end 124 is received by and engagable with the threaded bore 65 of the second side member 64 of the outer frame assembly. The tapered member can be angularly displaced from the connection member 124 and is adapted to retain the food 12 between the tool end 122 and the first or second members of the inner frame assembly, or the food 12 can be impaled by the tapered member.

In use, it can now be understood that collapsible food holding system 10 can be used as a food stand or as a food carrying and positioned device. The collapsible food holding system can be stored in its folded or collapsed orientation in a drawer, which can be easily removed by a user. The user can then grab on end member of the inner frame assembly and the end member of the outer frame assembly and pivot the collapsible food holding system into an open orientation. The first stop edges will come into contact with each other and prevent the collapsible food holding system from opening past predetermined angular position, thus creating an ideal configuration for use. The tapered ends of the pair of tool ends are inserted into the food item, thereby securing the food item to the collapsible food holding system.

To use the collapsible food holding system as a carrying or positioning device, the user would use their hands to grasp the pair of handles positioned near each end of the collapsible food holding system. The handles are easily and comfortably grasped because of the grips and the arcuate ends of the ribs which provide a flush surface on the inner side of the grips. The user can then carry and position the food item under running water to clean or rinse the food item.

After food item has been cleaned, the collapsible food holding system can then be placed on a surface for the user to prepare or further clean the food item. While the collapsible food holding system is in its open configuration, the end member of the outer frame assembly, and one of the handle members and the end members of the inner frame assembly are aligned on the same plane. This produces a stable base for the collapsible food holding system, since the end member of the outer frame assembly, the handle member and the end member of the inner frame assembly are all in contact with the surface. The ribs of the grips of the outer frame end member, the handle member, and the inner frame end member prevent the collapsible food holding system from slipping or sliding on the surface, thereby producing a very stable stand.

After the user has completed preparing or cleaning the food item, the collapsible food holding system and the food item can then be placed directly in the oven or grill. This allows for the food item to be cooked in an elevated position which in turn lets all the grease produced during the cooking process to drip from the food item. The collapsible food holding system can also be placed on a pan filled with water and flavoring chips to create a smoker.

When the user is finished using the collapsible food holding system, the food item is removed from the tool ends and the collapsible food holding system can then cleaned or placed in a standard dishwasher. The collapsible food holding system can be folded or collapsed into its closed configuration by grabbing the end member of the inner frame assembly and one of the end members of the outer frame assembly and pivoting the collapsible food holding system into a closed orientation. The second stop edges will come into contact with each other and prevent the collapsible food holding system from closing past a predetermined angular position.

While a preferred embodiment of the collapsible food holding system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, composite, or a variety of alloys may be used instead any above-described materials. And although holding and supporting food during preparation, cleaning or cooking have been described, it should be appreciated that the collapsible food holding system herein described is also suitable for holding any object stable while in use, such as but not limited to holding material to be sculpted, holding canvas to be painted, or holding an object to be machined.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A food holding system for retaining a food item during preparation, cleaning or cooking, said food holding system comprising:
   an inner frame assembly having an enclosed configuration and a pair of hinges, said inner frame assembly further comprising at least one first side member, at least one second side member, and a pair of end members, each of said first and second side members includes at least one of said hinges respectively, one of said end members being fixed to free ends of said first and second side members, and the other of said end member being fixed to free ends of said first and second side members; and
   an outer frame assembly having a substantially U-shaped configuration, at least one tool end located at each free end thereof, and a pair of hinges, each one of said hinges of said outer frame assembly being pivotably engagable with one of said hinges of said inner frame assembly respectively, said tool ends being configured to engage with a food item;
   wherein said outer frame assembly being sized and configured to receive said inner frame assembly in its interior when said food holding system is pivoted about said hinges;
   wherein said inner frame assembly further comprising a pair of extension side members extending from said first and second side members in the vicinity of at least one of said end members of said inner frame assembly, and a second end member fixed to free ends of said pair of extension side members, said second end member being substantially parallel with at least one of said end members of said inner frame assembly respectively.

2. The food holding system as set forth in claim 1, wherein said outer frame assembly further comprising at least one first side member, at least one second side member, and an end member, each of said first and second side members includes at least one of said outer frame assembly hinges respectively, said end member being fixed to free ends of said first and second side members, each of said tool ends being removably attachable to a free end of said first and second side members respectively opposite said end member.

3. The food holding system as set forth in claim 2, wherein said end members and said second end member of said inner frame assembly, and said end member of said outer frame assembly being at least partially enclosed with a grip.

4. The food holding system as set forth in claim 3, wherein each of said grips further comprising a plurality of ribs extending out from said grip.

5. The food holding system as set forth in claim 3, wherein each of said grips further comprising a plurality of ribs configured to prevent lateral movement of said food holding system when in contact with a surface.

6. The food holding system as set forth in claim 1, wherein each of said hinges of said inner frame assembly further comprising a stop extending out from said hinge, a post extending out from a center of said hinge, and a threaded bore defined in a free end of said post.

7. The food holding system as set forth in claim 6, wherein each of said hinges of said outer frame assembly further comprising a stop extending out from said hinge of said outer frame assembly toward said hinge of said inner frame assembly, a first bore defined through a center of said hinge of said outer frame assembly, and a second bore defined about and in communication with said first bore, said first bore being adapted to receive said post of said hinge of said inner frame assembly respectively, said second bore being located opposite said stop of said hinge of said outer frame assembly and adapted to receive a head of a fastener, each of said fasteners being adapted to engage with said threaded bores of said posts.

8. The food holding system as set forth in claim 7, wherein each of said stops of said hinges of said inner frame assembly further comprising a first and second stop edges forming said stop into a protrusion, and wherein each of said stops of said hinges of said outer frame assembly further comprising a first and second stop edges forming said stops into a protrusion.

9. The food holding system as set forth in claim 8, wherein said first and second stop edges of said stops of said hinges of said inner frame assembly being positioned at different angles with reference to said first and second side members of said inner frame assembly respectively, wherein said first and second stop edges of said stops of said hinges of said outer frame assembly being positioned at different angles with reference to said first and second side members of said outer frame assembly respectively, and wherein said first stop edges of said inner and outer frame assemblies contact each other when said food holding system is pivoted to an open configuration, and said second stop edges of said inner and outer frame assemblies contact each other when said food holding system is pivoted to a closed configuration.

10. The food holding system as set forth in claim 1, wherein each of said hinges of said inner frame assembly further comprising a post featuring a threaded end, wherein each of said hinges of said outer frame assembly further comprising a bore defined therethrough adapted to receive said post and sized to allow said threaded end of said post to extend past said hinge of said outer frame assembly, said threaded end being engagable with a nut.

11. The food holding system as set forth in claim 10, wherein said inner frame assembly further comprising at least one stop positioned to contact said outer frame assembly when said food holding system is pivoted about said hinges to an open configuration, and is configured to prevent said outer frame from pivoting past a predetermined angle.

12. The food holding system as set forth in claim 1, wherein said food holding system is supported on a surface by a portion of said outer frame assembly, at least one of said end members of said inner frame assembly, and said second end member of said inner frame assembly, when said food holding system is in an open configuration.

13. The food holding system as set forth in claim 1, wherein said tool end is removably attachable to said free end of said outer frame assembly.

14. A food holding system comprising:
an inner frame assembly having a pair of parallel first side members, a pair of parallel second side members, a pair of end members, a pair of hinges, and a pair of handles located at opposite ends, one of said first and second side members being fixed to one of said hinges opposite of each other, the other said first and second side members being fixed to the other said hinge opposite of each other, one of said end members being fixed to free ends of said first side members, and the other of said end member being fixed to free ends of said second side members, one of said handles being located in the vicinity of one of said end members, and the other said handle being located in the vicinity of the other said end members;
an outer frame assembly having a pair of parallel first side members, a pair of parallel second side members, an end member, and a pair of hinges, one of said first and second side members being fixed to one of said hinges opposite of each other, the other said first and second side members being fixed to the other said hinge opposite of each other, said end member being fixed to free ends of said first side members, said hinges of said outer frame assembly being pivotably engagable with said hinges of said inner frame assembly respectively; and
at least one tool end attachable to a free end of at least one of said second side members of said outer frame assembly, said tool end being adapted to retain a food item thereon;
wherein said outer frame assembly being sized and adapted to receive said inner frame assembly in its interior when said food holding system is pivoted about said hinges.

15. The food holding system as set forth in claim 14, wherein each of said handles of said inner frame assembly further comprising a pair of parallel handle side members, and a handle member fixed to free ends of said handle side members, said handle side members being substantially perpendicular to said first and second side members respectively.

16. The food holding system as set forth in claim 15, wherein said end members and said handle members of said inner frame assembly, and said end member of said outer frame assembly being enclosed with a grip, and wherein each of said grips further comprising a plurality of ribs extending out from said grip.

17. The food holding system as set forth in claim 14, wherein each of said hinges of said inner frame assembly further comprising a stop extending out from said hinge featuring first and second stop edges at different angels with reference to said first side member, a post extending out from a center of said hinge, and a threaded bore defined in a free end of said post, and wherein each of said hinges of said outer frame assembly further comprising a stop extending out from said hinge toward said hinge of said inner frame assembly featuring a first and second stop edges at different angles with reference to said first side member, a first bore defined through a center of said hinge, and second bore defined about and in communication with said first bore, said first bore being adapted to receive said post of said hinge of said inner frame assembly respectively, said second bore being located opposite said stop of said hinge of said outer frame assembly and adapted to receive a head of a fastener, each of said fasteners being adapted to engage with said threaded bores of said posts.

18. The food holding system as set forth in claim 17, wherein said first and second stop edges of said stops of said hinges of said inner frame assembly being positioned at different angles with reference to said first side member of said inner frame assembly, wherein said first and second stop edges of said stops of said hinges of said outer frame assembly being positioned at different angles with reference to said first side member of said outer frame assembly, and wherein said first stop edges of said inner and outer frame assemblies contact each other when said food holding system is pivoted to an open configuration, and said second stop edges of said inner and outer frame assemblies contact each other when said food holding system is pivoted to a closed configuration.

19. The food holding system as set forth in claim 14, wherein each of said hinges of said inner frame assembly further comprising a post featuring a threaded end, wherein each of said hinges of said outer frame assembly further comprising a bore defined therethrough adapted to receive said post and sized to allow said threaded end of said post to extend past said hinge of said outer frame assembly, said threaded end being engagable with a nut, and wherein said inner frame assembly further comprising at least one stop positioned to contact said outer frame assembly when said food holding system is pivoted about said hinges to an open configuration and is configured to prevent said outer frame from pivoting past a predetermined angle.

20. A food holding system comprising:
an inner frame assembly having a pair of parallel first side members, a pair of parallel second side members, a pair of end members, a pair of hinges, and a pair of handles located opposite of each other, one of said first and second side members being fixed to one of said hinges opposite of each other, the other said first and second side members being fixed to the other said hinge opposite of each other, one of said end members being fixed to free ends of said first side members, and the other of said end member being fixed to free ends of said second side members, one of said handles being located in the vicinity of one of said end members, and the other said handle being located in the vicinity of the other said end members;
an outer frame assembly having a pair of parallel first side members, a pair of parallel second side members, an end member, and a pair of hinges, one of said first and second side members being fixed to one of said hinges opposite of each other, the other said first and second side members being fixed to the other said hinge opposite of each other, said end member being fixed to free ends of said first side members, said hinges of said outer frame assembly being pivotably engagable with said hinges of said inner frame assembly respectively; and
at least one tool end attachable to a free end of at least one of said second side members of said outer frame assembly, said tool end being adapted to retain a food item thereon;

wherein said outer frame assembly being sized and adapted to receive said inner frame assembly in its interior when said food holding system is pivoted about said hinges;

wherein each of said handles of said inner frame assembly further comprising a pair of parallel handle side members, and a handle member, said handle side members being substantially perpendicular fixed to said first and second side members respectively, said handle member being fixed to free ends of said handle side members;

wherein said end members and said handle members of said inner frame assembly, and said end member of said outer frame assembly being enclosed with a grip, and wherein each of said grips further comprising a plurality of ribs extending out from said grip.

* * * * *